(No Model.) 2 Sheets—Sheet 1.
E. I. NICHOLS.
FRUIT PITTING MACHINE.
No. 413,831. Patented Oct. 29, 1889.
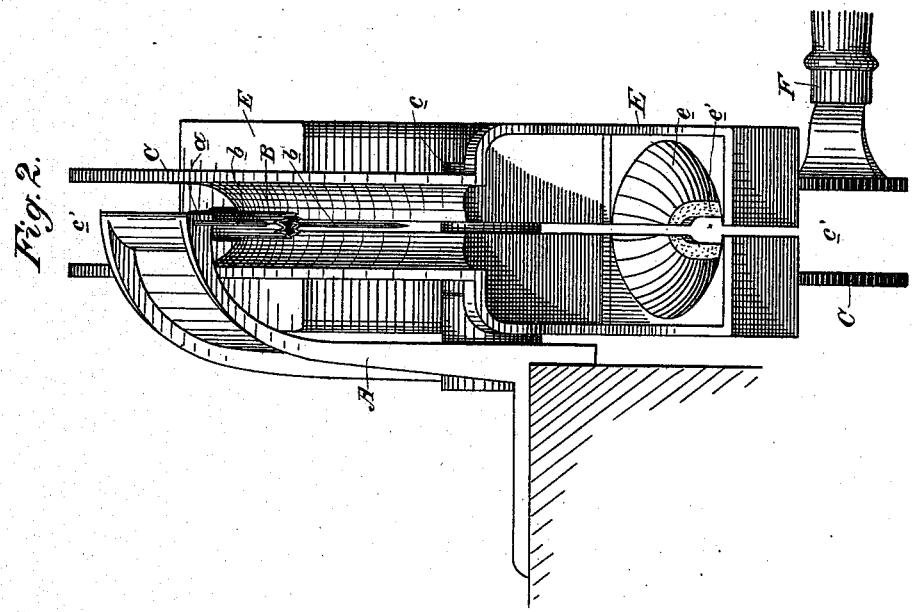
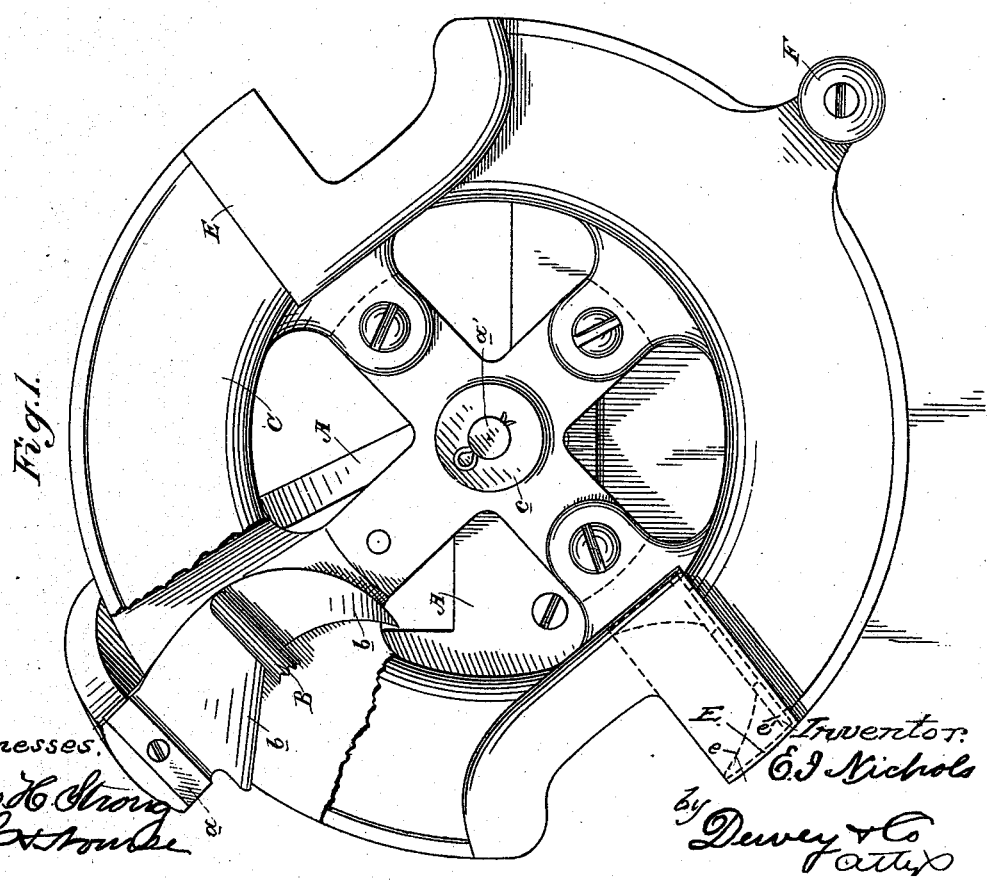

(No Model.)  E. I. NICHOLS.  2 Sheets—Sheet 2.
FRUIT PITTING MACHINE.
No. 413,831.  Patented Oct. 29, 1889.
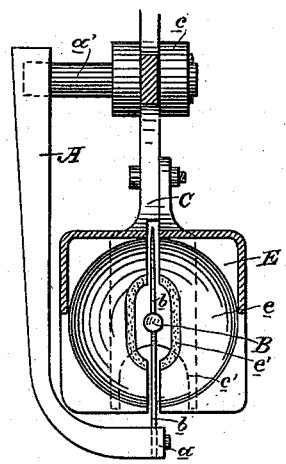
Witnesses,
Geo. H. Strong
Inventor
Emory I. Nichols
By Dewey & Co.
Attys

UNITED STATES PATENT OFFICE.

EMORY I. NICHOLS, OF SAN FRANCISCO, CALIFORNIA, ASSIGNOR TO THE NICHOLS MANUFACTURING COMPANY, OF SAME PLACE.

FRUIT-PITTING MACHINE.

SPECIFICATION forming part of Letters Patent No. 413,831, dated October 29, 1889.

Application filed January 16, 1889. Serial No. 296,544. (No model.)

*To all whom it may concern:*

Be it known that I, EMORY I. NICHOLS, of the city and county of San Francisco, State of California, have invented an Improvement in Fruit-Pitting Machines; and I hereby declare the following to be a full, clear, and exact description of the same.

My invention relates to that class of machines for extracting the pits or stones from fruit in which a winged punch is employed which is brought into contact with the fruit, whereby the punch drives out the pit, while the wings thereof sever the fruit and lay it open; and my invention consists in a fixed bracket carrying the winged punch, and a rotary wheel mounted on the fixed bracket and carrying sockets or seats for the fruit, so that by the rotation of the wheel the fruit is brought into contact with the fixed winged punch and its pit thereby driven out and its flesh cut open.

The object of my invention is to provide a simple and convenient fruit-pitting machine in which the operation is accomplished by a rotary motion, the advantages being greater convenience and a more rapid operation than in those machines in which the winged punch has imparted to it a reciprocating movement against a fixed bed.

Referring to the accompanying drawings for a more complete explanation of my invention, Figure 1 is a side elevation of my machine, a portion of the side rim of the wheel being broken away to show the winged punch, and Fig. 2 is an end view of the same. Fig. 3 is a view looking down on the winged punch, the socket E of the wheel being moved up under said punch and a section taken just above said socket on a plane parallel with radius of the wheel.

A is a bracket having a base-plate adapted to be screwed down to a table or other stand, whereby it is fixed. The bracket, as shown at $a$, has attached to its end a winged punch, which is formed of side knives or cutters $b$ and a central punch B, the bottom of which extends down beyond the cutting-surface of the knives. From the base of the bracket projects a journal-pin $a'$, upon which is mounted the hub $c$ of the carrier-wheel C. This wheel is formed with a deeply-grooved periphery $c'$, which, though it may be made in any suitable manner, I have here shown as being formed by attaching to the spokes of the wheel a second flange, which is separated from the first and main flange of the wheel, thereby forming the groove between the two. Into this groove the winged punch projects, traversing it radially, so as to have the fruit meet it squarely. In the periphery of the wheel are made the sockets E, one or more in number, as desired. These sockets have a perforated slitted base and receive the seats $e$ for the fruit. These seats are formed of plates of any suitable material—as, for example, iron, in which case I have under them the flexible cushion-pieces $e'$ to prevent injury to the fruit. The plates forming the seats $e$ are separated, so as to leave a space between them, and are grooved out to correspond to the perforated slitted base of the sockets E of the wheel, and the cushion-pieces $e'$ are likewise perforated and slitted. I do not confine myself to this form of seats for the fruit, as a suitably-shaped piece of rubber may be used, if desired; but by using the iron plates or other cheap substance I economize in the cost of manufacture over a rubber seat, and at the same time by having the small cushion-pieces $e'$, I have all the advantages of the rubber.

A handle or other driving appliance F is provided for the wheel C, whereby it may be rotated.

The operation of the machine is as follows: The fruit to be pitted is placed in the seat $e$, and the wheel is then turned so as to bring the fruit up against the fixed winged punch. The central piece or punch B is thereby brought into contact with the top of the pit, while the wings of the punch cut the flesh of the fruit into halves as its pit is driven out by the punch through the perforated seat and socket and discharged below. As the wheel continues to revolve, the halved fruit is dropped out into a suitable receptacle on the other side. A succeeding fruit is brought up into contact with the winged punch and operated upon as before. The fruit is fed to each seat as it comes up near to a horizontal position and in the vicinity of the fixed winged punch.

I am aware that it is not new in fruit-pitting machines to employ a winged punch which is forced down upon the fruit in a fixed seat below, and I do not, therefore, claim such, broadly.

Having thus described my invention, what I claim as new, and desire to secure by Letters Patent, is—

1. In a fruit-pitting machine, a rotary wheel having a grooved periphery with perforated-bottomed sockets formed therein for the fruit, in combination with a fixed punch lying within the grooved periphery of said wheel, with its axis in the line of travel thereof, substantially as described.

2. In a fruit-pitting machine, a rotary wheel having a grooved periphery with perforated and slitted bottomed sockets formed therein for the fruit, in combination with a fixed punch lying within the grooved periphery of said wheel, with its axis in the line of travel thereof, and cutting-wings secured to each side of the punch and lying within the grooved periphery of the wheel and in the radial plane thereof, substantially as described.

3. In a fruit-pitting machine, a fixed bracket having at its base a journal-pin and a rotary wheel mounted on said pin and having a grooved periphery with open-bottomed sockets formed therein, in combination with a punch fixed to the top of the bracket and lying within the grooved periphery of the rotary wheel, with its axis in the line of travel thereof, and cutting-wings secured to each side of the punch and lying within the grooved periphery of the wheel and in the radial plane thereof, substantially as described.

4. In a fruit-pitting machine, a winged punch, in combination with a carrier having sockets with perforated and slitted bottoms for the passage of the winged punch, separated metal plates fitted in said sockets as seats for the fruit, and perforated slitted cushion-pieces under said plates, with their edges projecting into the space between the separated bases thereof, substantially as described.

In witness whereof I have hereunto set my hand.

EMORY I. NICHOLS.

Witnesses:
S. H. NOURSE,
H. C. LEE.